TIRE RIMS

Original Filed Aug. 4, 1966 2 Sheets-Sheet 1

INVENTOR.
WILLIAM D. WALTHER
BY Hamilton & Cook
ATTORNEYS

TIRE RIMS

Original Filed Aug. 4, 1966 2 Sheets-Sheet 2

INVENTOR.
WILLIAM D. WALTHER
BY Hamilton & Cook
ATTORNEYS

United States Patent Office

Re. 27,220
Reissued Nov. 2, 1971

27,220
TIRE RIMS

William D. Walther, Dayton, Ohio, assignor to The Dayton Steel Foundry Company, Dayton, Ohio Original No. 3,421,797, dated Jan. 14, 1969, Ser. No. 570,269, Aug. 4, 1966. Application for reissue Nov. 19, 1969, Ser. No. 871,506
Int. Cl. B60b *25/06*
U.S. Cl. 301—12 1 Claim

Matter enclosed in heavy brackets [ ] appears in the original patent but forms no part of this reissue specification; matter printed in italics indicates the additions made by reissue.

ABSTRACT OF THE DISCLOSURE

A rim for mounting a tire. The rim has a fixed and a removable side flange. The base of the removable side flange is received in a cove on the rim edge and mechanically seats the tire bead. The tire bead is pneumatically sealed against a tapered surface adjacent the cove.

The present invention relates to improvements in rims for mounting tires; particularly heavy-duty or tubeless truck tires. More particularly, the invention relates to demountable rims having a removable side ring or bead flange to facilitate mounting of a tire.

The object of the invention is to provide an improved rim, having a removable side ring or bead flange, for the mounting of tubeless truck tires.

Further and specific objects of the invention as well as the advantages thereof over prior art tire rims having removable side rings will become apparent from the following specification and the attached drawings.

Figure 1:
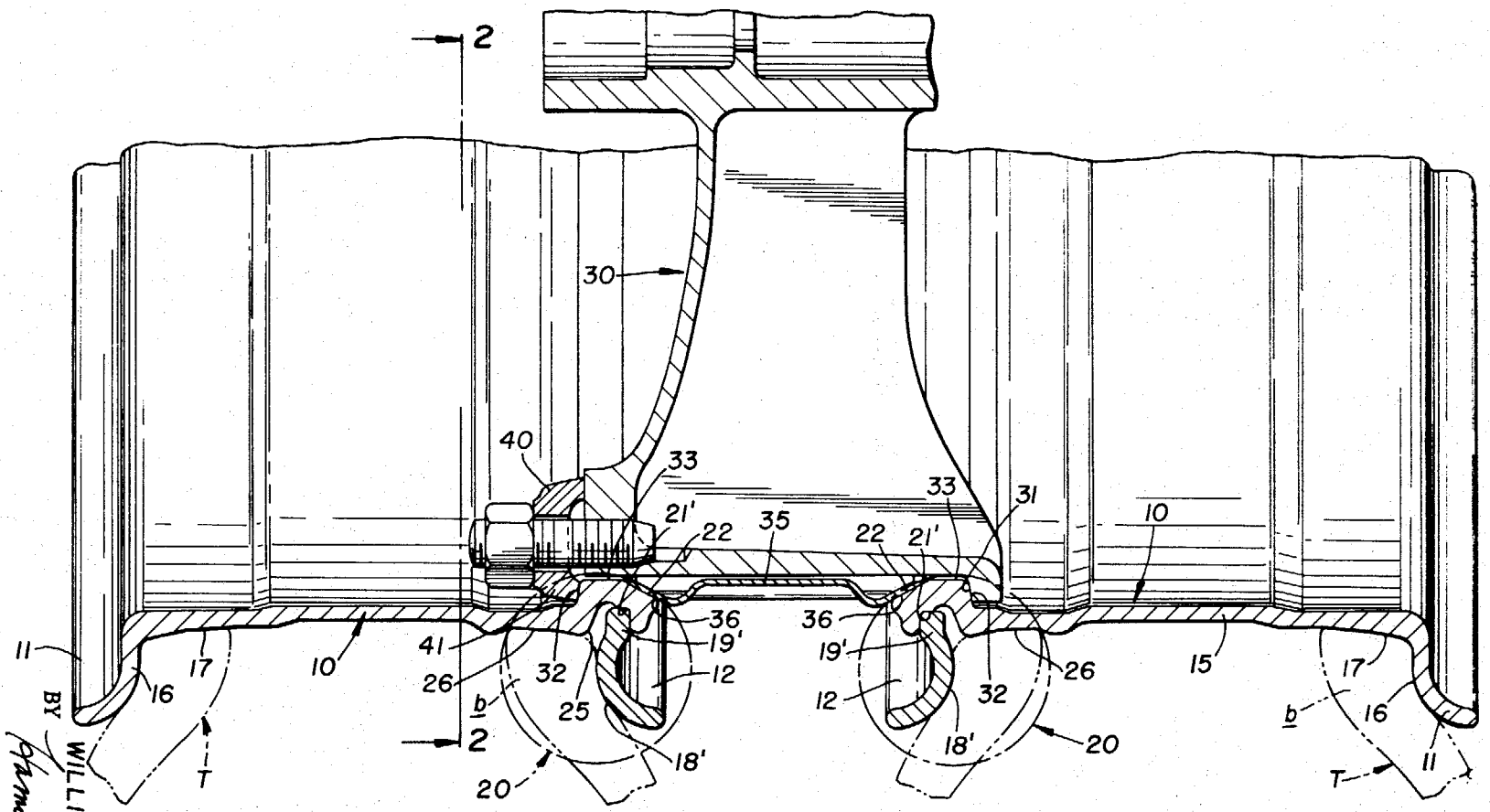
FIG. 1 is a sectional view illustrating a wheel and fastening means mounting dual, or inner and outer, rims according to the invention.
Figure 2:
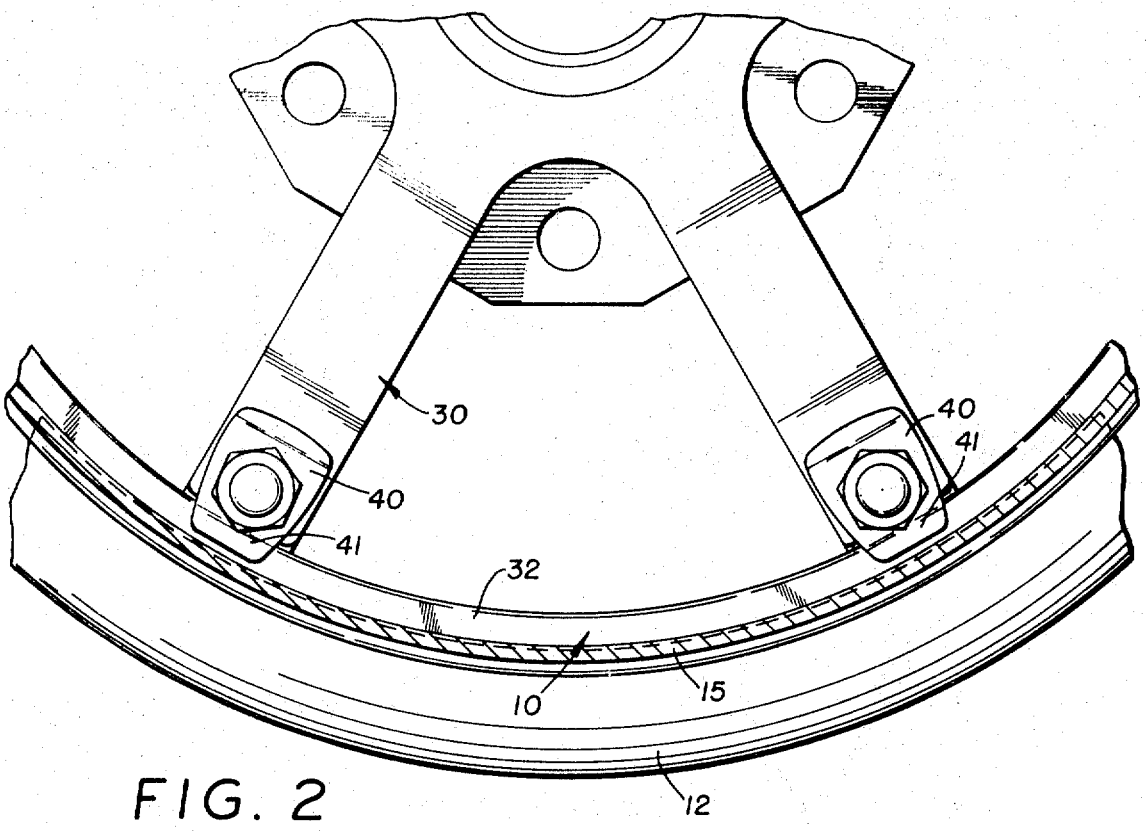
FIG. 2 is a fragmentary view taken substantially as indicated on line 2—2 of FIG. 1.

The tire rims according to the invention are indicated generally by the numeral 10. A tire T is mounted between a fixed side ring or bead flange 11 and a removable side ring or bead flange 12. The flanges 12 are carried by and mounted within a portion of the rim 10 which is enclosed within the circle designated 20.

The side flanges 11 and 12 are separated by an annular base portion 15 having an axial width as determined by the size and bead spacing of a tire T to be mounted on a rim 10. This is illustrated by FIG. 1 showing two relatively wide rims and by FIG. 3 showing one relatively narrow rim.

The fixed side flange 11 is formed integrally with the axially extending base portion 15. A flange 11 has a radially directed side portion 16 for confining the axially outer edge of a tire bead b. The radially inner portion of the tire bead b is seated on and pneumatically sealed against a surface 17 adjacent the flange side portion 16 and having a taper, such as the 5–8° taper shown in the drawings.

In a rim 10, the several improvements of the invention are provided by the structural features embodied in the rim portions enclosed by the circles 20.

Figure 3:
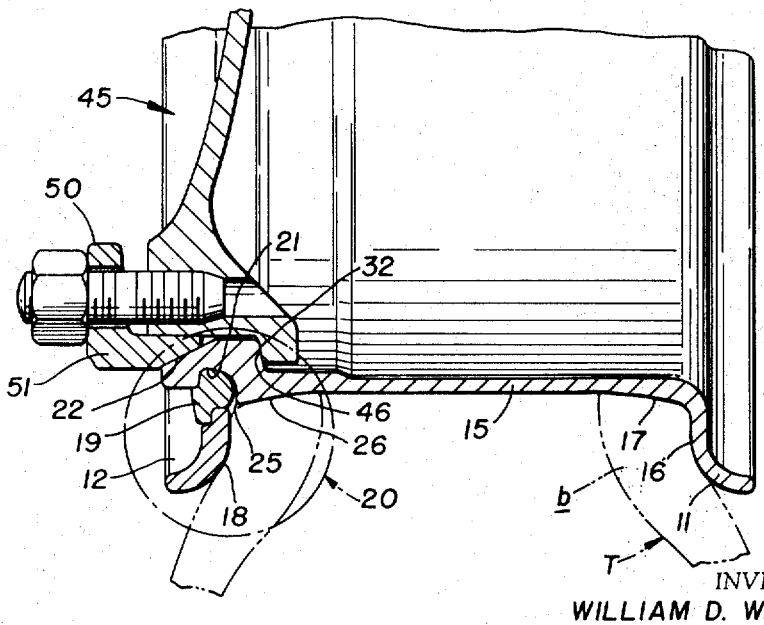
FIG. 3 is a sectional view illustrating a wheel and fastening means mounting a single rim according to the invention.

A side flange 12 may be in either a one-piece form (FIG. 1) or a two-piece form (FIG. 3). A flange 12 has a radially directed side portion 18 or 18' for confining the axially outer edge of a tire bead b and a specially shaped inner or base portion 19 or 19'. In the two-piece [sorm] *form* of FIG. 3, the mating faces of flange portions 18 and 19 are suitably notched, as shown, for secure mechanical engagement. For initial mounting of a flange 12 on the edge of the rim, the flange base portion 19 (of FIG. 3) is split radially. The flange base portion 19' (of FIG. 1) may be either split radially or else notched in two areas on the inside diameter.

The side flange base portions (19 or 19') are carried on the edge 20 of the rim base 15. The base portions (19 or 19') are mounted within a radially inwardly concave area 21 providing a cove for full surface mechanical seating of a correspondingly-shaped face on the base portions. In a rim 10, the cove area 21 begins axially inwardly of an axially inclined surface 22 adapted for wedging engagement with either a fastening means or clamp lug as further described below in connection with FIG. 3, or a spacer element as further described below in connection with FIG. 1.

As shown in FIG. 3, the axially outer portion of the cove 21 has the greater radially inward extent. As the cove area extends axially inward the extent of concavity gradually diminishes so that the cove area terminates abruptly radially inwardly and axially outwardly of a shoulder 25 on the rim base 15. The cove 21' as shown in FIG. 1 has the greater radially inward extent axially inward of the surfaces seating the flange base portions 19'. As in the FIG. 3 form, the cove area 21 terminates abruptly radially inwardly and axially outwardly of the rim base shoulder 25.

The cove areas, 21 and 21', of a rim 10 have been shown in the two forms of FIGS. 1 and 3 to illustrate the fact that the exact shape and configuration may vary somewhat, so long as the flange base portions, 19 or 19', are in secure mechanical engagement therewith when the tire T is mounted on the rim and inflated.

When the tire T is mounted and inflated, particularly a tubeless tire, the radially inner portion of the tire bead b is seated on and pneumatically sealed against a surface 26 beginning at shoulder 25 and extending axially inward at a desired taper, such as the 5–8° taper shown in the drawing. Therefore, when the tire T is mounted and inflated the axially outer portion of a tire bead b is mechanically seated against a side portion (18 or 18') of a bead flange 12, the pneumatic seal for the bead b being made solely by the seating of the tire against the shoulder surface 26. The radially inner axially outer edge of a tire bead is adapted to be received in a radially exposed portion of the cove between the rim shoulder 25 and the removable flange 12.

The rim 10 is intended to be mounted on conventional wheels. In FIG. 1, the wheel 30 has a relatively wide felly surface with a boss or stop surface 31 at the axially inner end adapted for mating engagement with a radially inclined surface 32 on the edge 20 of the inner rim. Axially outwardly of the surface 32, the rim edge 20 has a substantially flat axially extending felly seating surface 33. Axially outwardly of surface 33, the rim edge has the previously described axially inclined mounting surface 22. In FIG. 1, the inner and outer rims are separately by a spacer element 35, an annular band, having side surfaces 36 adapted to engage the surfaces 22 of each rim.

Referring still to FIG. 1, the outer rim is secured to the wheel 30 by a conventional bolt supported clamp 40 having an axially oriented or lateral leg 41 adapted for engaging the surface 32 on the rim edge.

In FIG. 3 the wheel 45 has a relatively narrow felly surface with a boss or stop surface 46 in the axially inner end adapted for mating engagement with the radially inclined surface 32 on the edge 20 of the single rim 10. The bolt supported clamp 50, having an axially oriented or laterally extending leg 51, engages the axially inclined nounting surface 22 for mounting of the rim on the /heel 45.

What is claimed is:

1. A demountable rim (10) having fixed and removble bead flanges, the bead flanges being separated by an nnular rim base portion (15), the fixed flange (11) beıg formed integrally with the rim base portion, the reıovable flange (12) being carried on and mounted within n edge (20) of the rim base portion, characterized in that ıe radially inner portion of the rim edge (20) has an uter axially inclined surface (22) [, a medial substanally horizontal felly engaging surface (33)] and an iner radially inclined surface (32), the radially outer poron of said rim edge has a radially inwardly concave rea (21) providing a cove surface for full mechanical ɜating of a correspondingly-shaped mating face of the ase portion (19, 19′) of the removable flange (12), said ɔve being located between said axially inclined surface 22) and said radially inclined surface (32) and terminatıg on a radial line inwardly of a shoulder (25) on the m base portion, said rim having an integral surface 26) *adjacent said cove* tapered at 5° to 8° for seating ıe radially inner portion of a tire bead, the axially outer ɔrtion of a tire bead being mechanically seated against radial side portion (18, 18′) of said removable flange, ıere being a radially exposed portion of said cove between the removable flange and said rim shoulder adapted to receive the radially inner axially outer edge of a tire bead.

References Cited

The following references, cited by the Examiner, are of record in the patented file of this patent or the original patent.

UNITED STATES PATENTS

| | | | |
|---|---|---|---|
| 2,048,177 | 7/1936 | Burger | 301—12 |
| 2,904,096 | 9/1959 | Mueller | 152—406 |
| 2,152,757 | 4/1939 | Burger | 301—13 SM |
| 2,188,271 | 1/1940 | Swain. | |
| 2,948,568 | 8/1960 | Hykes | 152—406 X |
| 3,079,200 | 2/1963 | Main. | |

FOREIGN PATENTS

| | | |
|---|---|---|
| 626,162 | 2/1936 | Germany. |
| 199,525 | 9/1958 | Austria. |
| 546,938 | 8/1942 | Great Britain. |
| 552,363 | 4/1943 | Great Britain. |

R. J. JOHNSON, Primary Examiner

U.S. Cl. X.R.

301—13 SM